United States Patent
Hughes et al.

[11] Patent Number: 5,754,655
[45] Date of Patent: May 19, 1998

[54] SYSTEM FOR REMOTE PURCHASE PAYMENT AND REMOTE BILL PAYMENT TRANSACTIONS

[76] Inventors: Thomas S. Hughes, 31310 Eagle Haven Cir., Ste. 100, Rancho Palos Verdes, Calif. 90274; Gustavo Molina, 24292 Rhona Dr., Laguna Niguel, Calif. 92656

[21] Appl. No.: 891,440

[22] Filed: Jul. 10, 1997

Related U.S. Application Data

[63] Continuation-in-part of Ser. No. 286,619, Aug. 5, 1994, abandoned, which is a continuation-in-part of Ser. No. 888,780, May 26, 1992, Pat. No. 5,336,870.

[51] Int. Cl.⁶ .......................................... G07F 7/08
[52] U.S. Cl. .................. 380/24; 235/380; 705/17; 902/24
[58] Field of Search ................ 380/4; 902/22,24; 705/17; 235/380

[56] References Cited

U.S. PATENT DOCUMENTS

| | | | |
|---|---|---|---|
| D. 266,929 | 11/1982 | Coppola et al. | D14/106 |
| 4,053,735 | 10/1977 | Foudis . | |
| 4,341,951 | 7/1982 | Benton . | |
| 4,454,414 | 6/1984 | Benton . | |
| 4,536,647 | 8/1985 | Atalla . | |
| 4,575,621 | 3/1986 | Drenfus . | |
| 4,652,698 | 3/1987 | Hale . | |
| 4,675,815 | 6/1987 | Kuroki et al. | 380/24 X |
| 4,678,895 | 7/1987 | Tateisi . | |
| 4,689,478 | 8/1987 | Hale et al. | 235/380 |
| 4,815,031 | 3/1989 | Kurakawa . | |
| 4,839,504 | 6/1989 | Nakaino . | |
| 4,972,457 | 11/1990 | O'Sullivan | 379/59 |
| 5,050,207 | 9/1991 | Hitchcock . | |
| 5,220,501 | 6/1993 | Lawlor et al. | 902/24 |
| 5,331,138 | 7/1994 | Saroya | 235/449 |
| 5,334,821 | 8/1994 | Campo et al. | 235/380 |
| 5,371,345 | 12/1994 | LeStrange et al. | 235/380 |

*Primary Examiner*—Gilberto Barron, Jr.
*Attorney, Agent, or Firm*—Lee W. Tower

[57] ABSTRACT

A terminal is provided for allowing a user to conduct remote purchase payment and remote bill payment transactions with a remote host computer. In one embodiment, the terminal includes a QWERTY alphabetic keyboard (14), a numeric keypad (16), a magnetic card reader (54), a display (12), a printer (52), a modem (338), an earphone 402, a microphone 404, and a cellular phone 408 all integral to the terminal. A controller is included for operating the terminal and communicating with the remote host computer system via the modem, the controller coupled to the QWERTY alphabetic keyboard (14), the numeric keyboard (16), the magnetic card reader (54), the display (12), the printer (52), and the modem (338). A memory (332) is coupled to the controller for storing a transaction log of purchase payment transactions, each purchase payment transaction in the transaction log comprising a date and a time of purchase payment transaction, an amount of the purchase payment transaction, information identifying a merchant, information identifying an item or service purchased, and data for identifying the transaction.

10 Claims, 19 Drawing Sheets

190

```
PURCHASE PAYMENT TRANSACTION RECEIPT
<TERMINAL NAME>
<TERMINAL ADDRESS>
<TERMINAL CITY STATE>
DATE MM/DD/YY  TIME HH:MM
AMOUNT        : $<AMOUNT>
ACCOUNT #     : <ACCOUNT NUMBER>/EXPIRE DATE
TERMINAL#     : <TERMINAL NUMBER>
MERCHANT #    : <MERCHANT ID>
TRACE#        : <TRACE ID>
ITEM#         : <PURCHASED ITEM IDENTIFIER>
ACCOUNT       : <ACCOUNT TYPE> SAVINGS,
                CHECKING
SEQUENCE#     : <SEQUENCE NUMBER>
AUTH NUMBER   : <AUTHORIZATION NUMBER FROM
                HOST>
                <APPROVED OR DENIED>
REFERENCE#    : <RETRIEVAL REFERENCE NUMBER>
MERCH. NAME   : <MERCHANT DESCRIPTION>
```

```
BILL PAYMENT TRANSACTION RECEIPT
<TERMINAL NAME>
<TERMINAL ADDRESS>
<TERMINAL CITY STATE>
DATE MM/DD/YY  TIME HH:MM
ACCOUNT#   : <ACCOUNT NUMBER>/EXPIRE DATE
TERMINAL#  : <TERMINAL NUMBER>
ACCOUNT    : <ACCOUNT TYPE> SAVINGS,
             CHECKING
=========PROFILE DATA=========

== <MERCHANT NUMBER>       ==
== <MERCHANT NAME>         ==
AMOUNT        :      $____
AUTH NUMBER   : <AUTHORIZATION NUMBER FROM
                 HOST>
                <APPROVED OR DENIED>
SEQUENCE#     : <SEQUENCE NUMBER>
REFERENCE#    : <RETRIEVAL REFERENCE
                 NUMBER>
                    .
                    .
                    .

== <MERCHANT NUMBER>       ==
== <MERCHANT NAME>         ==
AMOUNT        :      $____
AUTH NUMBER   : <AUTHORIZATION NUMBER FROM
                 HOST>
                <APPROVED OR DENIED>
SEQUENCE#     : <SEQUENCE NUMBER>
REFERENCE#    : <RETRIEVAL REFERENCE
                 NUMBER>

================================

TOTAL APPROVED:       $____
```

```
SETTLEMENT REVIEW RECEIPT
<TERMINAL NAME>
<TERMINAL ADDRESS>
<TERMINAL CITY STATE>
DATE MM/DD/YY  TIME HH:MM
TERMINAL#     : <TERMINAL NUMBER>
     CREDIT TRANSACTIONS
        SALES COUNT     : XXXX
        SALES AMOUNT    : $XXXXX.XX
        RETURN COUNT    : XXXX
        RETURN AMOUNT   : $XXXXX.XX
     DEBIT TRANSACTIONS
        SALES COUNT     : XXXX
        SALES AMOUNT    : $XXXXX.XX
        RETURN COUNT    : XXXX
        RETURN AMOUNT   : $XXXXX.XX

NET COUNT          : XXXX
     NET AMOUNT         : $XXXXX.XX

HOST TOTALS IF TERMINAL NOT IN BALANCE WITH
HOST

HOST TOTALS
     CREDIT TRANSACTIONS
        SALES COUNT     : XXXX
        SALES AMOUNT    : $XXXXX.XX
        RETURN COUNT    : XXXX
        RETURN AMOUNT   : $XXXXX.XX
     DEBIT TRANSACTIONS
        SALES COUNT     : XXXX
        SALES AMOUNT    : $XXXXX.XX
        RETURN COUNT    : XXXX
        RETURN AMOUNT   : $XXXXX.XX

NET COUNT          : XXXX
     NET AMOUNT         : $XXXXX.XX
```

FIG. 10

SYSTEM FOR REMOTE PURCHASE PAYMENT AND REMOTE BILL PAYMENT TRANSACTIONS

CROSS-REFERENCE TO RELATED APPLICATIONS

This is a continuation-in-part of application Ser. No. 08/286,219 filed on Aug. 5, 1994, now abandoned, which is a continuation-in-part of patent application, Ser. No. 07/888, 780 filed May 26, 1992, issued as U.S. Pat. No. 5,336,870 on Aug. 9, 1994. The subject matter of all the above application are incorporated herein by this reference, as though set forth in full.

BACKGROUND OF THE INVENTION

1. Field of the Invention

This invention relates to systems for purchase payment and bill payment transactions.

2. Description of the Related Art

Currently point of sale terminals have become common at such locations as: Carl's Jr., a fast food restaurant, Hughes grocery markets, and ARCO gas stations. To operate these point of sale terminals the user is prompted to insert his or her debit ATM (automatic teller machine) card into a terminal card reader located at the site of the purchase and then is prompted for his or her PIN (personal identification number) and then the user enters the amount of the purchase or the amount of the purchase may be automatically supplied by the register at the Carl's Jr. or the pump at the ARCO station. If approved by a remote host computer, funds are automatically transferred from the user's account to the merchant's account. Alternately, if the purchase is made with a credit card, then the amount of the purchase is automatically debited to the user's credit card. These point of sale terminals located at a merchant are designed to have a limited function and are convenient to use for that limited function; however, to be more useful it is necessary to have a system and terminal with additional functions.

Various portable terminals are in the prior art; however, they have various limitations. For example, U.S. Pat. No. 5,050,207 discloses a portable automated teller machine with transducers to couple to a host bank computer via a telephone handset of any phone. It allows the user to securely access bank and bank accounts and to securely effect either interaccount transfers or bill payments; however the device has no alphabetic keyboard, printer or magnetic card reader. U.S. Pat. Nos. 4,689,478, 4,652,698, 4,536,647, and 4,454,414 for portable terminals have some of the same limitations.

U.S. Pat. No. 4,341,951 has a mechanism for printing on a vendor voucher, but assumes that the terminal is portable and taken to the merchant, which is highly inconvenient and negates the concept of electronic shopping.

The current devices are not convenient or general purpose enough. For example, there is generally no convenient way to enter alphabetic data on these terminals. They are optimized for numeric data such as PIN and amount data. An example, is the popular VERIFONE, which like the devices above has a touch tone type keypad with the ten digits and "*" and "#". As is normally the case on telephone touch tone keypads, letters are associated with each digit. For example, the letters "A", "B" and "C" are associated with the digit "2". It is possible to enter a letter by going into an alphabetic mode and by pressing the "2" key once, twice or thrice to pick a letter to enter; however, this is very inconvenient, and therefore limits the usefulness of these terminals.

The user in the home needs more functions than the typical point of sale terminal or VERIFONE provide. For example, most individuals pay monthly bills by writing checks and mailing or delivering them. It would be desirable to have a terminal in the home that could provide this function in a convenient manner. It would also be desirable to have the ability to pay for purchases immediately upon selecting an item to purchase, for instance an item in a catalog. This would speed delivery for the consumer and provide better cash flow for the merchant. Also, it would be more convenient and secure if the user did not have to give a credit card number directly to an operator or salesperson.

SUMMARY OF THE INVENTION

It is an object of this invention to provide a terminal which can perform purchase payment and bill payment transactions. It is another object of this invention to provide a terminal to allow debit and credit card holders the ability to conveniently and remotely perform these financial transactions. It is another object of this invention to provide a terminal to allow smart card holders to also remotely perform these financial transactions.

It is another object of this invention to combine a telephone function with the terminal. Another object of this invention to provide for wireless or cellular telephone communication with a remote host computer.

It is yet another object of this invention to provide a system including a terminal and a personal computer.

According to one embodiment of the invention, a terminal is provided for allowing a user to conduct remote purchase payment transactions with a remote host computer. The terminal includes a QWERTY alphabetic keyboard for entering alphabetic information integral to the terminal, a numeric keypad for entering numeric information integral to the terminal, a magnetic card reader for reading a magnetically encoded card integral to the terminal, a display integral to the terminal, a printer integral to the terminal, a modem for communication on telephone lines integral to the terminal, a controller for operating the terminal and communicating with the remote host computer system via the modem, the controller coupled to the QWERTY alphabetic keyboard, the numeric keyboard, the magnetic card reader, the display, the printer, and the modem, and a memory coupled to the controller for storing a transaction log of purchase payment transactions, each purchase payment transaction in the transaction log comprising a date and time of the purchase payment transaction, an amount of the purchase payment transaction, information identifying a merchant, information identifying an item or service purchased, and data for identifying the transaction.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 6 is the format of a purchase payment transaction receipt in accordance with the present invention.

FIG. 8 is the format of a bill payment transaction receipt in accordance with the present invention.

FIG. 10 is the format of a settlement review receipt in accordance with the present invention.

DETAILED DESCRIPTION

Figure 1:
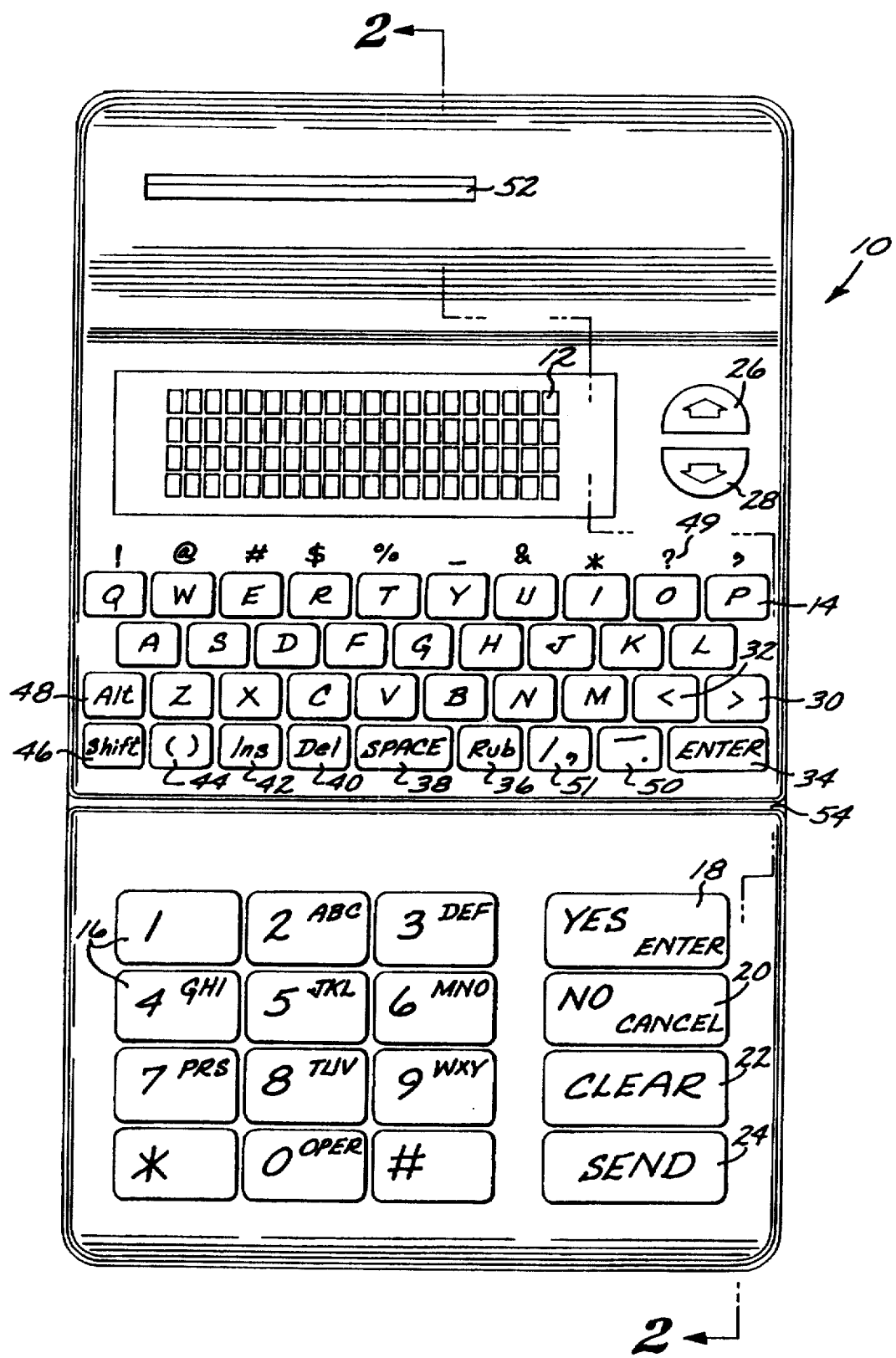
FIG. 1 is a top view of the terminal in accordance with the present invention.

Referring now to the drawings, and more particularly, to FIG. 1, there is shown a top view of the terminal 10 in accordance with the invention. The terminal has a display 12, a QWERTY alphabetic keyboard 14, a numeric keypad 16, and a magnetic card reader slot 54. Miscellaneous keys include: YES/ENTER key 18, NO/CANCEL key 20, CLEAR key 22, SEND key 24, up key 26, down key 28, left key 30, right key 32, ENTER key 34, rubout (Rub) key 36, space key 38, delete (DEL) key 40, insert (INS) key 42, parenthesis key 44, shift key 46, and alt key 48. A set of miscellaneous symbols 49 are available on the upper row of QWERTY keys by using the alt key 48. Also available are the "-", "." key 50 and the "/", "," key 51.

Figure 2:
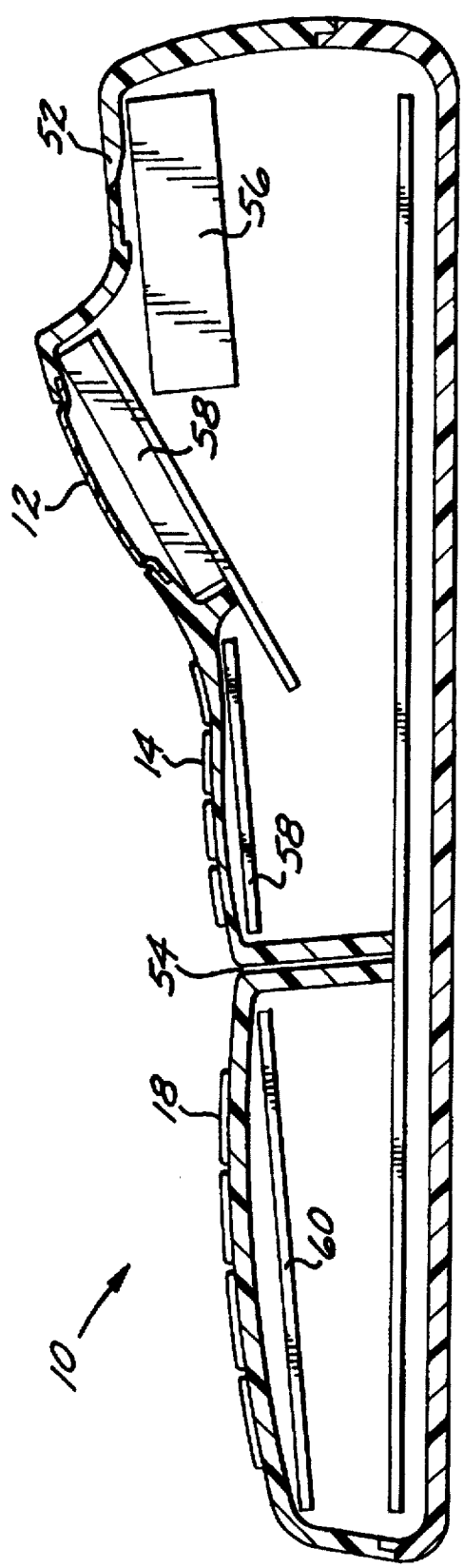
FIG. 2 is a sectional side elevation view of the terminal taken along line 2—2 of FIG. 1.

FIG. 2 is a sectional side elevation view of the terminal. In FIG. 2 the magnetic card reader slot 54 between the QWERTY alphabetic keyboard 14 and the numeric keypad 16 is evident, as is paper slot 52. Also shown in FIG. 2 are the locations of the printer 56, liquid crystal display (LCD) module 58, alphabetic keypad module 60 and numeric keypad module 62.

The display 12 in one embodiment is a liquid crystal with 20 characters×4 lines and is a supertwist, reflective display with black foreground on yellow/green background. Scrolling through the display is accomplished by using the left key 30, right key 32, down key 28, and up key 26.

The printer 56 is fed paper from a paper roll (not shown), which would be attached to the terminal. In one embodiment the printer would be a thermal type with a 7×5 character dot matrix. The printer can be implemented with a SEIKO MTP-201.

The magnetic card reader positioned alongside magnetic card reader slot 54 is a hand swipe, bidirectional type, and conforms to A.B.A. track II standard and can be implemented with a MAGTEK 21006505 I.C.

Figure 3:
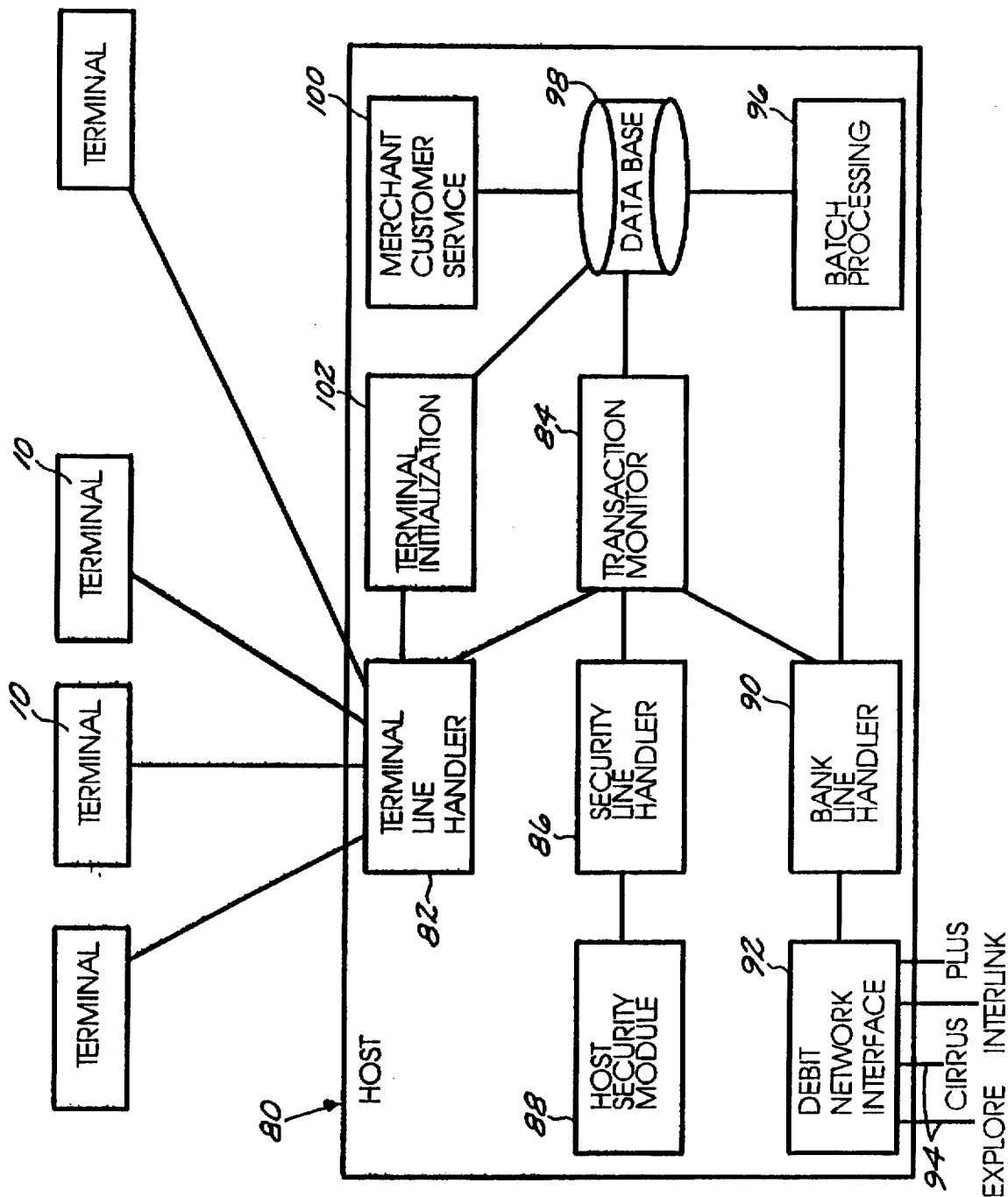
FIG. 3 is a diagram showing a system for bill payment and purchase transactions in accordance with the present invention.

The overall system is shown in FIG. 3. The remote host system 80 is the engine that receives the terminal requests and manages the bank link interactions and consists of computers, modems, and communication drivers. Message traffic is predominantly initiated from the terminal 10 located in homes or offices. Transaction requests are connected to the remote host system 80 processing center through terminal line handler 82 processes. The terminal line handler 82 process translates the terminal message format to an internal format used within the remote host system 80. These standardized messages are then passed to the transaction monitor 84 process, which determines the requirements of the request. If a PIN needs translation the transaction monitor 84 requests this from the security line handler 86, which is connected to a host security module 88 that performs all PIN translations. A PIN is always encrypted for transmission between secure zones. Encryption can be performed with a Racal Guardata RG6000.

The bank line handler 90 presents the request messages to the authorizing institution, which may be via debit network interface 92 to debit networks 94, after translating the internal message format to the proper format. The response of that request is then sent directly back to the terminal line handler 82 process for return to the terminal 10. There is a bank line handler 90 for each link to each bank including the debit network which could, for example, include the EXPLORE, CIRRUS, INTERLINK, and PLUS networks.

The transaction monitor 84 process is responsible for all message switching decisions and required disk input/output for the remote host system 80. The transaction monitor 84 accepts requests from the terminal line handler 82 and bank line handler 90 and initiates requests to the security line handler 86 and bank line handler 90. It verifies the terminal, merchant and card as appropriate and will perform any standing processing required by the remote host system 80.

Additional message traffic can be initiated by the financial institution in the form of network control messages and key management requests. Requests are generated by batch processes and from customer and merchant support functions. These requests are channeled to the appropriate locations and replies are returned depending on the type of transaction being performed.

The terminal initialization 102 process provides terminal initialization of customer information. Merchant and customer service 100 provides the following information: transaction detail that can be inquired on by a merchant or a terminal; date and time; merchant setup information; and terminal setup information.

The batch processing 96 system provides settlement initiation to the associated bank line handler 90 processes and reports for the remote host system 80 can also be created from this process.

Figure 4:
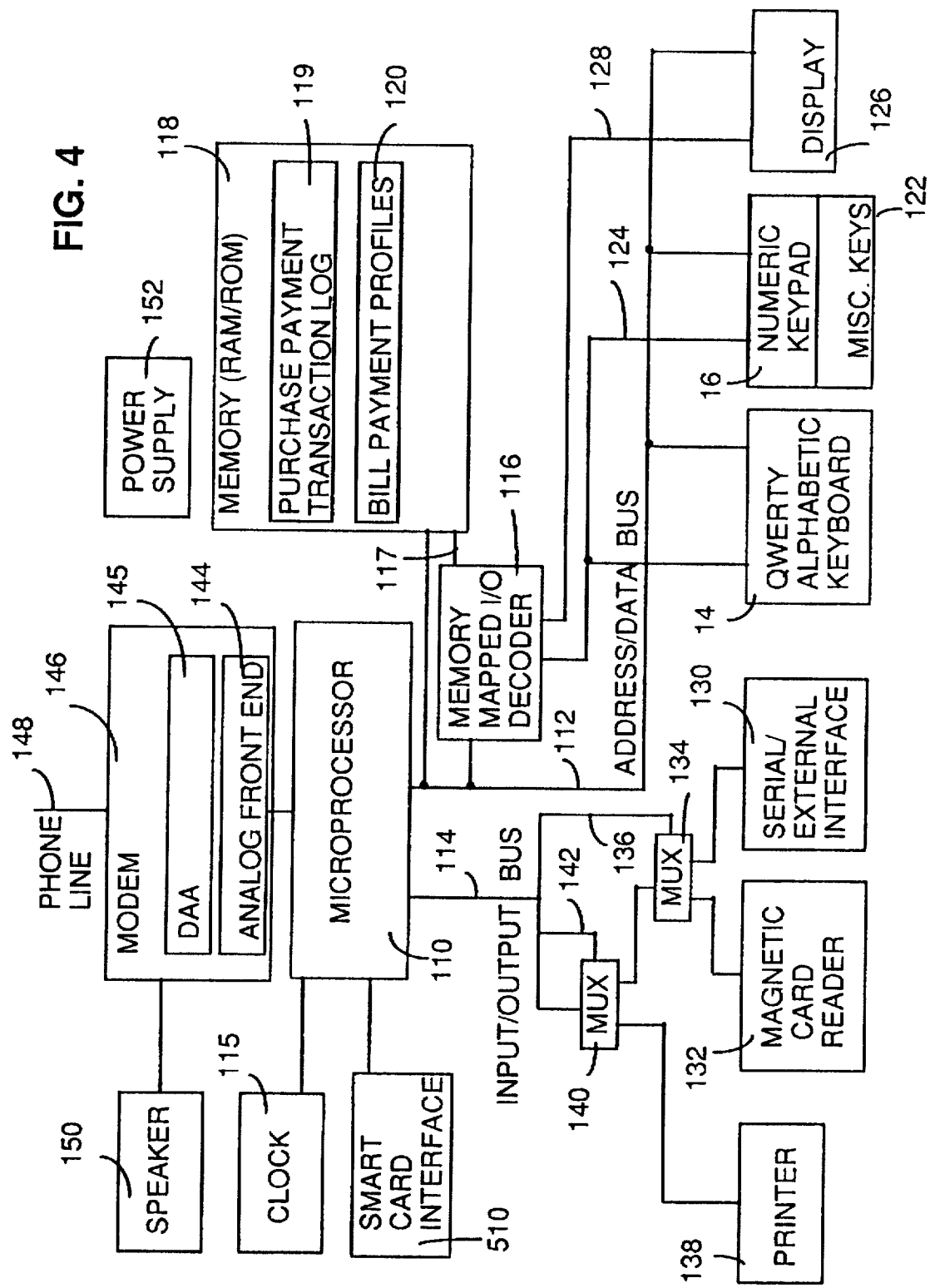
FIG. 4 is a functional block diagram of the terminal in accordance with the present invention.

FIG. 4 is a functional block diagram of the terminal 10. A microprocessor unit 110, which can be implemented as an Intel 8096, has interfaces with the remainder of the functional elements via three interfaces: an interface to a modem 146, address and data bus 112 and input/output bus 114.

The modem 146 comprises an analog front end 144, which is linked to a DAA 145 that is an interface that isolates the analog front end 144 from the phone line 148. The modem 146 is coupled to phone line 148 and has the following protocols: CCITT V.22 bis with 2400 bps synchronous and asynchronous and 1200 bps synchronous and asynchronous; CCITT V.22 A & B with 1200 bps synchronous and asynchronous; Bell 212A with 1200 bps synchronous and asynchronous; and CCITT V.21/Bell 103 with up to 300 bps asynchronous. The analog front end 144 can also drive a speaker 150.

The address and data bus 112 is decoded by a memory mapped I/O decoder 116, which determines the sources and destinations for the address and data bus 112 including: memory 118, which has both random access memory (RAM) and read only memory (ROM) and has a plurality of banks selected by bank select 117; QWERTY alphabetic keyboard 14, numeric keypad 16 and miscellaneous keys 122, which are enabled via select 124; and display 126, which is enabled via select 128. The memory 118 has 64K bytes, which is allocated to the program for the microprocessor unit 110 and the transaction log 119 and profile list 120.

The input/output bus 114 communicates via multiplexer 140 and multiplexer 134 to printer 138, magnetic card reader 132 and serial interface 130. The RS232 serial interface is 300, 600, 11200, 2400, 4800, or 9600 baud, and has a XON-XOFF feature available.

Power is supplied by power supply 152, which uses normal wall power and a backup 3 volt lithium battery for non volatile memory support.

The terminal 10 requires software initialization for key information, dynamic customer dependent information and host initiated updates. After final assembly and test the terminal 10 is injected with the encryption key and terminal number. The key injection is done by external connection to a Remote Key Injection Facility (RKIF), which is a secure device to inject the key information needed for handling PIN data. The base derivation key is the key used as a seed for injection into the terminals from the RKIF.

After purchase there are a series of functions that the terminal performs for initialization with the remote host system 80. First, the customer supplies customer information to the remote host system 80. On connection to the remote host system 80 via modem 146, the remote host system 80 reads the terminal serial number and validates it. Then the remote host system 80 loads the terminal with the customer name and address.

The terminal can then be updated based on information available to the host during the course of another transaction. For example: (a) the terminal 10 initiates a call to the remote host system 80 for another function; (b) remote host system 80 completes original transaction and notifies terminal that additional information is available, such as: changes to existing customer information; additions and deletions to the bill payment profiles; or software modifications in areas that are not protected.

The terminal is protected from undesired software changes by detecting any difference between a calculated checksum and a stored checksum. If there is any difference, then the following actions take place: the internal encryption key is erased; most of the internal software is erased or destroyed to be made unfunctional; the display is set to ask the user to call customer service in a unique way; and the terminal will initiate one call and notify the host of the current state and report the terminal number. Other software checks include a check code included with all merchant numbers, which is validated prior to acceptance and validation that all amount entries are within range and any entry outside of that range must be reentered.

The terminal maintains internal counters and status registers that are available to the host when requested at the end of a normal transaction. They include: total number of transaction requests; total number of encryptions; total number of approved transactions, which is a called a sequence number; last retrieval reference number received by the terminal; total dollar amount and transaction count for current date; and total dollar amount and transaction count for the last N days, where N could be 7 days for a week. The sequence number internal counter can be stored in memory 118 and is incremented by the microprocessor unit 110 when a transaction is approved. The sequence number can be used to track each approved transaction for the terminal.

The terminal manages a local data base including a transaction log and a profile list. Each of these are as large as the memory permits. The characteristics of these data bases are as follows:

1. TRANSACTION LOG
    CONTENTS—The transaction structure contains all the information for purchase payment transactions.
    (1) date mm/dd/yy time hh:mm
    (2) amount: $<amount>
    (3) account#: <account number>/expire date
    (4) terminal#: <terminal number>
    (5) merchant#: <merchant id>
    (6) trace#: <trace id>
    (7) item#: <purchased item identifier>
    (8) account: <account type>savings, checking
    (9) sequence#: <sequence number>
    (10) authorization number: <authorization number from host> <approved or denied>
    (11) reference#: <retrieval reference number>
    (12) merchant name: <merchant description>
    STRUCTURE—This file is a stack with the most recent transaction on the top.
2. PROFILE LIST
    CONTENTS—The profile structure contains:
    (1) profile number
    (2) profile merchant name
    (3) amount to send
    (4) amount last sent
    (5) date last sent
    (6) next date to send
    (7) response (approved/denied)
    (8) card issuing authorization number from host
    (9) retrieval reference number
    (10) sequence number of last transaction
    STRUCTURE—The profile list will always be stored in profile number order.

The profile number is selected by the host to signify a specific bill pay account. It references both the merchant number and also the merchant internal account for that user. The profile number is translated in the host to provide the merchant with the user specific information needed to credit the customer's account once a bill is paid.

The retrieval reference number is generated by the host to aid in tracking a transaction within the processing system. The retrieval reference number is built of the least significant digit of the year, the gregorian date and a sequence number that is reset at the beginning of each day and incremented for each transaction served by the remote host system 80.

Figure 5A:
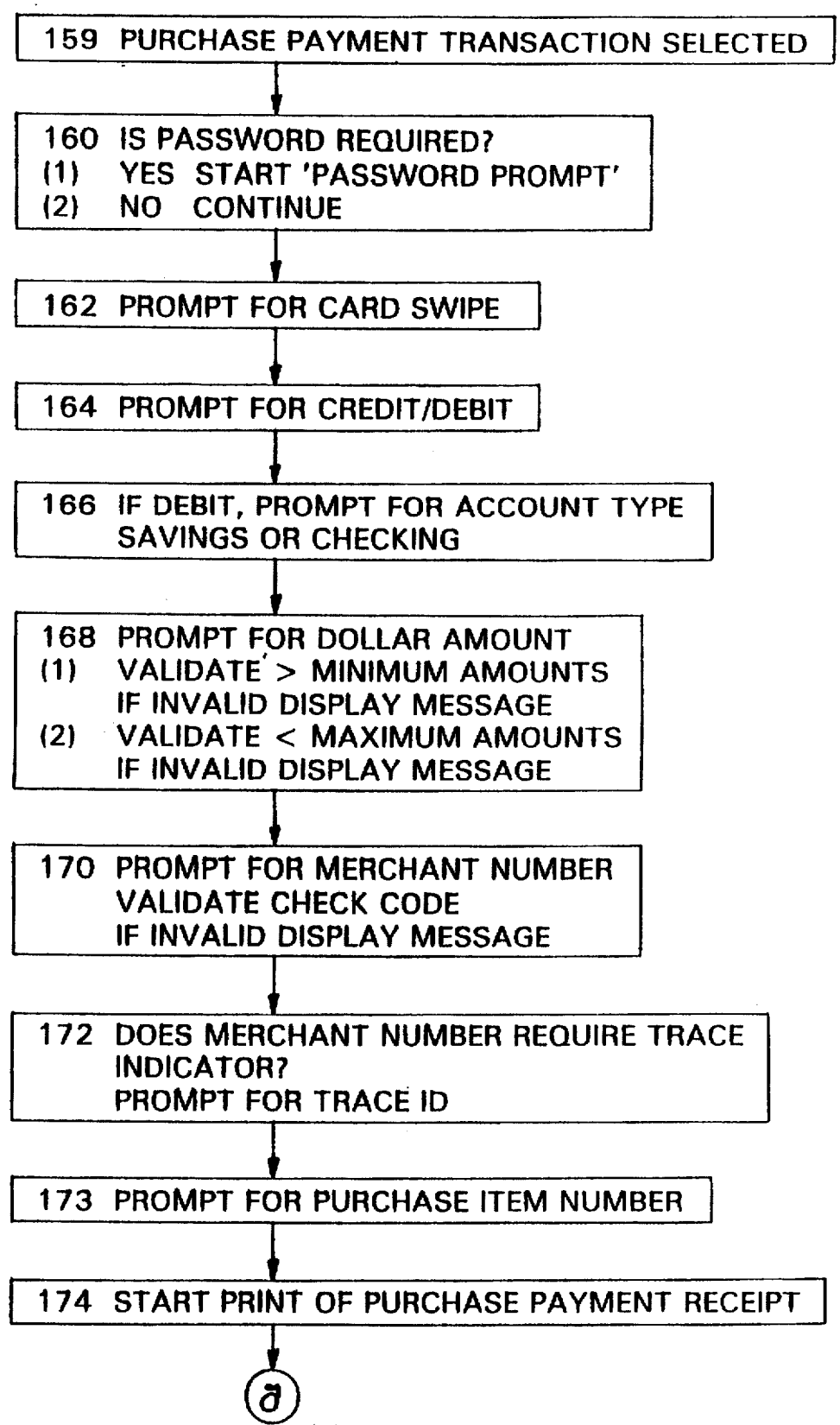
FIGS. 5A and 5B are flow charts for a purchase payment transaction in accordance with the present invention.
Figure 5B:
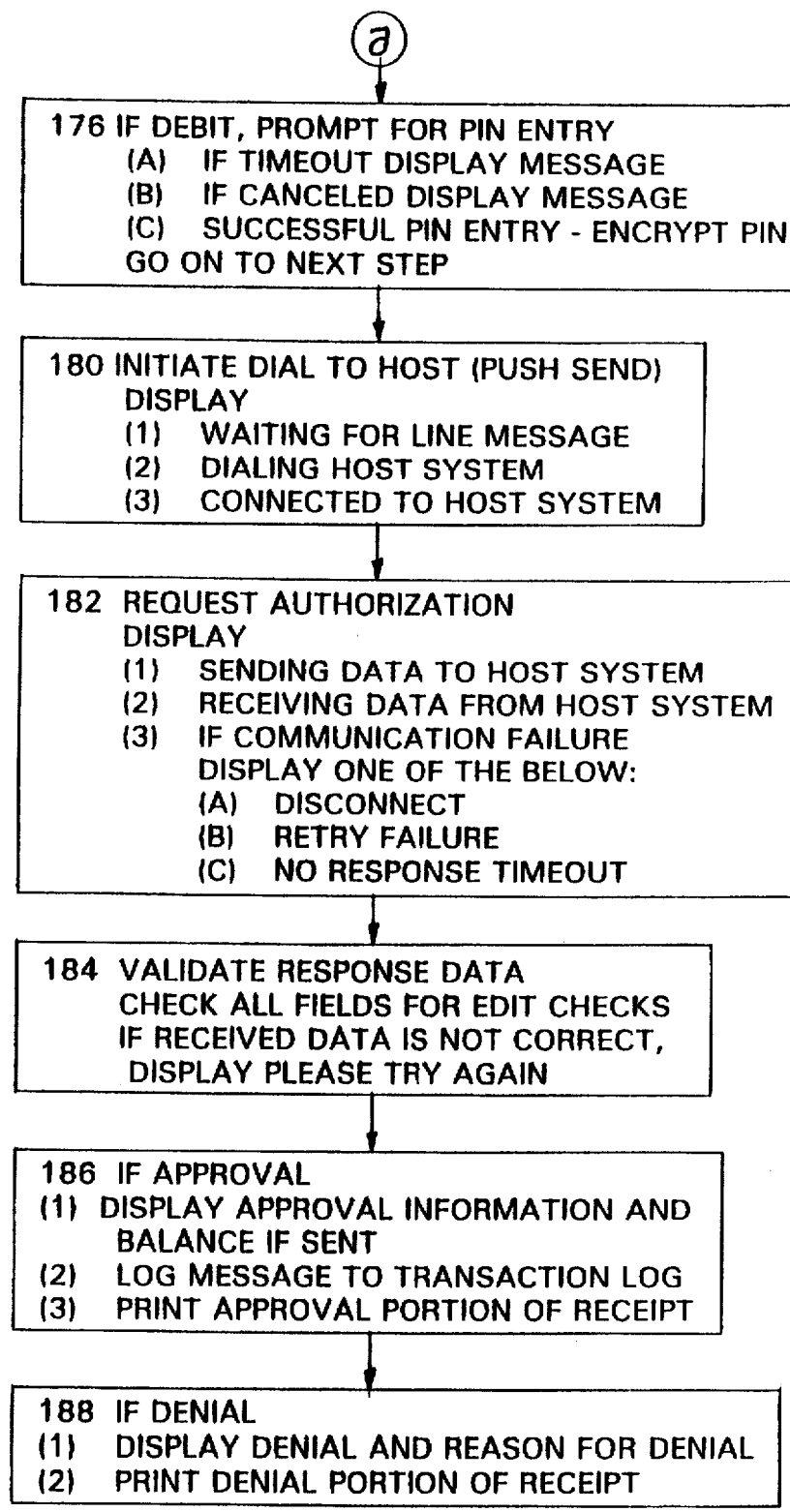
Figure 7A:
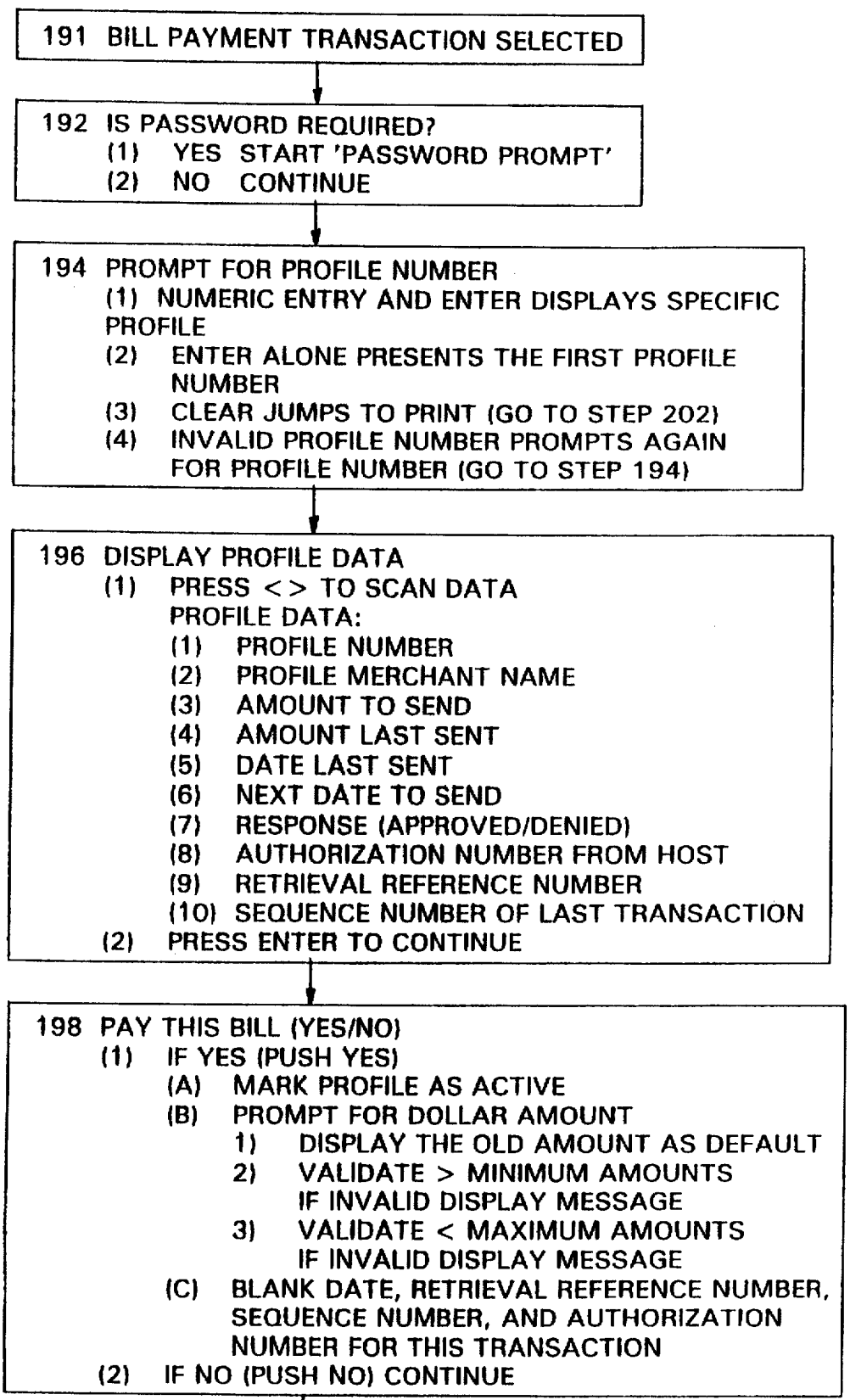
FIGS. 7A, 7B and 7C are flow charts for a bill payment transaction in accordance with the present invention.
Figure 7B:
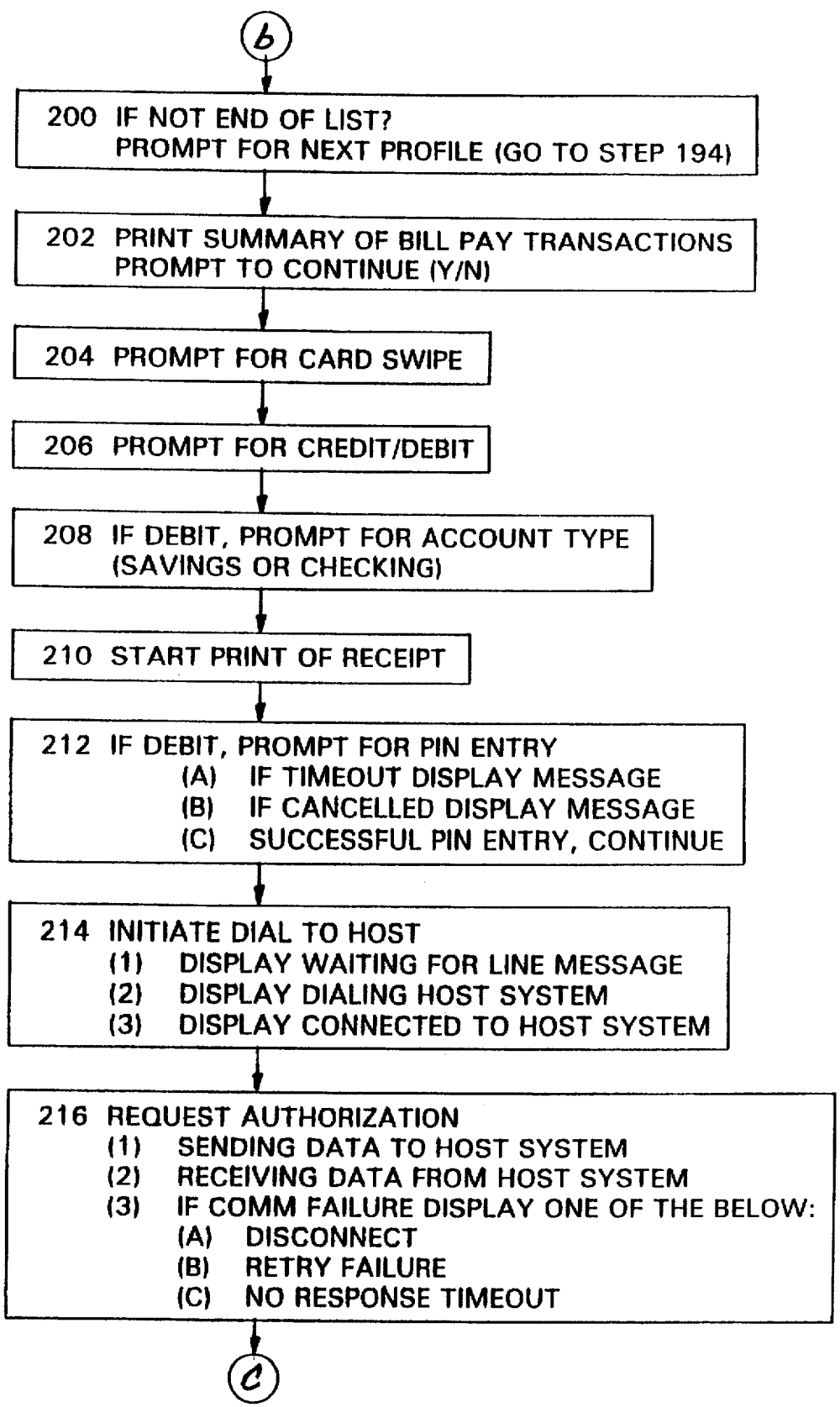
Figure 7C:
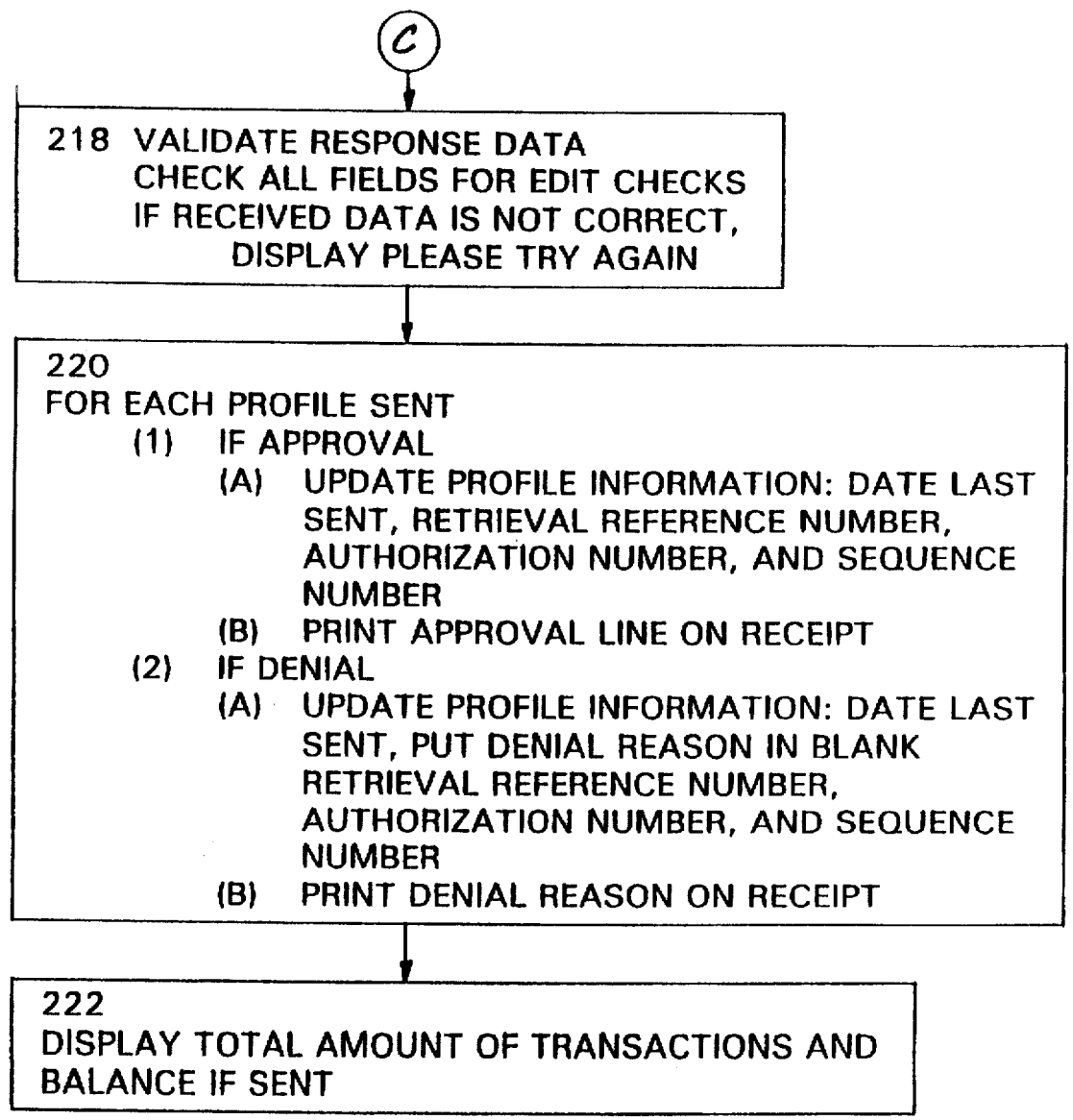
Figure 9:
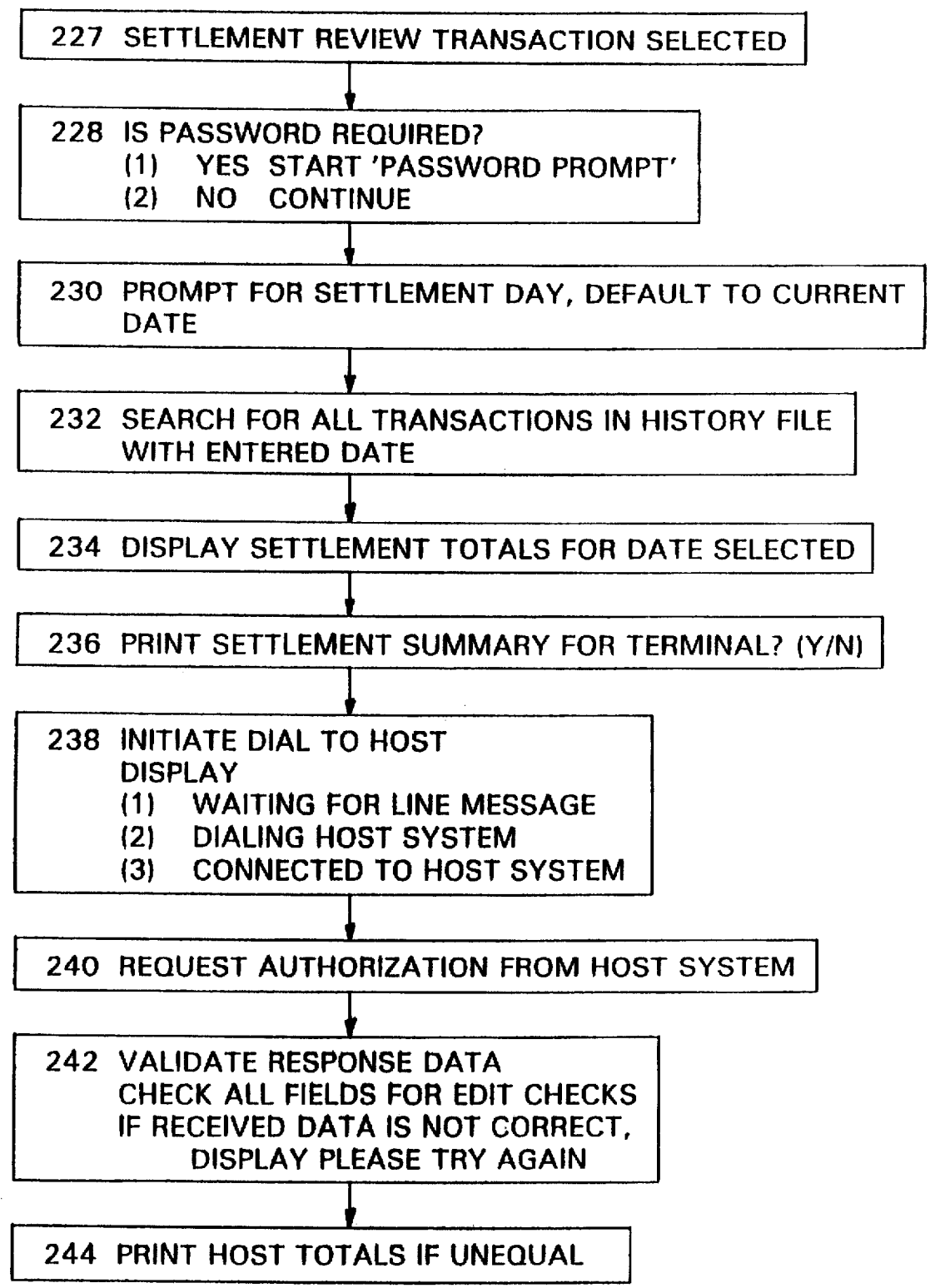
FIG. 9 is a flow chart of a settlement review transaction in accordance with the present invention.

The terminal 10 and remote host system 80 supports several types of transactions. The purchase payment transaction requests an authorization for a purchase from the selected merchant. FIG. 5 charts steps 159 to 188 for a purchase payment transaction and FIG. 6 is a purchase payment transaction receipt. The bill payment transaction provides a means for reviewing bill payment type transactions by inspecting the profile list and then initiating the actual money transfer to the selected merchants in the profile list. FIG. 7 charts steps 191 to 222 for a bill payment transaction and FIG. 8 is a bill payment transaction receipt. FIG. 9 charts steps 227 to 244 for a settlement review transaction and FIG. 10 is a settlement review receipt.

The purchase payment transaction is begun by communicating with a merchant and selecting an item. This could be done over the phone or from a catalog. Then payment is sent via the purchase payment transaction. The steps outlined in FIG. 5 include: 160 entering a password if required; 162 prompting for a card swipe; 164 prompting for credit/debit; 166 if debit, prompting for account type, savings or checking; 168 prompting for dollar amount and validating that the dollar amounts are within range limits set by card issuing authority; 170 prompting for merchant number and validating check code; 172 prompting for trace indicator, which uniquely identifies a specific customer, if desired by merchant; 173 prompting for a purchase item number; 174 starting print of purchase payment receipt; 176 if debit, then prompting for PIN entry and encrypting PIN using derived unique key per transaction algorithm (DUKPT); 180 initiating dial to host (user pushes SEND key 24) and displaying status; 182 requesting authorization from card issuing authority and displaying status; 184 validating response data; 186 if approval, displaying approval information and balance if sent, logging message to transaction log, printing approval portion of receipt; and 188 if denial, displaying denial and reason for denial and printing denial portion of receipt.

FIG. 6 shows a purchase payment receipt. The receipt items include: terminal name and address from the customer supplied information, the date and time from the host, the amount of the transaction, the account number and expiration date from the credit or debit card, the terminal number, the merchant number, the trace number, the purchase item number, the account type savings or checking, the sequence number, the authorization number from the card issuing authority and approved or denied, the retrieval reference number generated at host, which is a combination of the date and the host sequence number and provides a method of tracing the transaction through the host system, and the merchant name.

The bill payment transaction provides a means for reviewing a profile list and selecting which bills to pay. The steps as outlined in FIG. 7 include: 192 prompting for a password; 194 prompting for a profile number, wherein numeric entry and ENTER 18 displays specific profile, ENTER key 34 alone presents the first profile number, CLEAR key 22 jumps to print, and an invalid profile number results in prompting for the profile number again; 196 displaying profile data: profile number, profile merchant name, amount to send, amount last sent, date last sent, next date to send, response (approved/denied), card issuing authorization number from host, retrieval reference number of last transaction, and sequence number of last transaction; 198 prompting whether to pay this bill, if yes, (user pushes YES/ENTER key 18) which marks profile as active, prompting for dollar amount and displaying the old amount as default, validating amount, and blanking: date last sent, retrieval reference number, sequence number and authorization number for this transaction; if no, (user pushes NO/CANCEL key 20) then continue; 200 if not end of profile list, prompting for next profile and repeating steps 192 to 200; 204 prompting for card swipe; 206 prompting for credit/debit; 208 if debit, prompting for account type, savings or checking; 210 starting print of receipt; 212 if debit, prompting for PIN entry; 214 initiating dial to host and displaying status; 216 requesting authorization from card issuing authority via remote host system 80; 218 validating response data; 220 for each profile sent, if approval, updating profile information: date last sent, retrieval reference number, card issuing authorization number, sequence number, print approval line on receipt; or if denial, updating profile information: date last sent, place denial reason in retrieval reference number, authorization number, and sequence number, and printing denial reason on receipt; and 222 displaying total amount of transactions and balance if sent.

FIG. 8 shows a bill payment transaction receipt. The receipt items include: terminal name and address from the customer supplied information, the date and time from the host, the account number and expiration date from the credit or debit card, the terminal number, the account type, and then profile information for each profile transaction: the merchant number, the merchant name, the amount, the authorization number, the sequence number and the retrieval reference number, and finally the total amount approved and paid.

It is possible to print the profile list, which gives the status of all bill pay transactions, and also to print the transaction log for purchase payment transactions.

It is also possible to cancel purchase payment transactions, which would be used for returns or for just canceling an order shortly after executing a purchase payment transaction. If mistakes are made in bill payment then it is also possible to cancel a bill payment.

The settlement review transaction provides a means to do daily settlement of the terminal 10 with the remote host system 80. The steps as outlined in FIG. 9 include: 228 prompting for password; 230 prompting for settlement day, defaulting to current date; 232 searching for all transactions in history file with entered date; 234 displaying settlement totals for date selected; 236 printing settlement summary for terminal (user pushes YES/ENTER key 18); 238 initiating dial to host and display status; 240 requesting authorization from remote host system 80; 242 validating response data; and 244 printing host totals if unequal.

FIG. 10 shows a settlement review receipt. The receipt items include: terminal name and address from the customer supplied information; the date and time from the host; the terminal number; the credit transaction sales count, sales amount, return count, and return amount; the debit transaction sales count, sales amount, return count, and return amount; and the net count and net amount all for the terminal; and if the host totals are not in balance with the terminal then the corresponding data from the host for the date in question.

In a specific embodiment of the invention the terminal end includes a clock 115, as shown in FIG. 4, which is coupled to microprocessor unit 110. The purpose of the clock is to provide a time output which includes a date. The date is used to prompt the user to perform a bill payment transaction for a profile on the date of the next date to send a bill payment for that profile. The next date to send a bill payment is updated each time a bill payment transaction is completed. For example, if a bill payment is made on July 1st then the next date to send a bill payment could be set to August 1st. The microprocessor unit 110 would periodically compare the date from clock 115 to the profiles stored in memory 118. If the date read from clock 115 matches a next date to send bill payment in a profile, then the user is prompted via display 126 to perform a bill payment transaction for that profile. Each bill payment profile, as described above, contains information identifying the merchant, the amount of the last bill payment, the date on which the last bill payment was sent, and a next date to send the bill payment.

The clock 115 can also be used to obtain a date and time of a purchase payment transaction which is recorded in memory 118 when a purchase payment transaction is performed.

Figure 11:
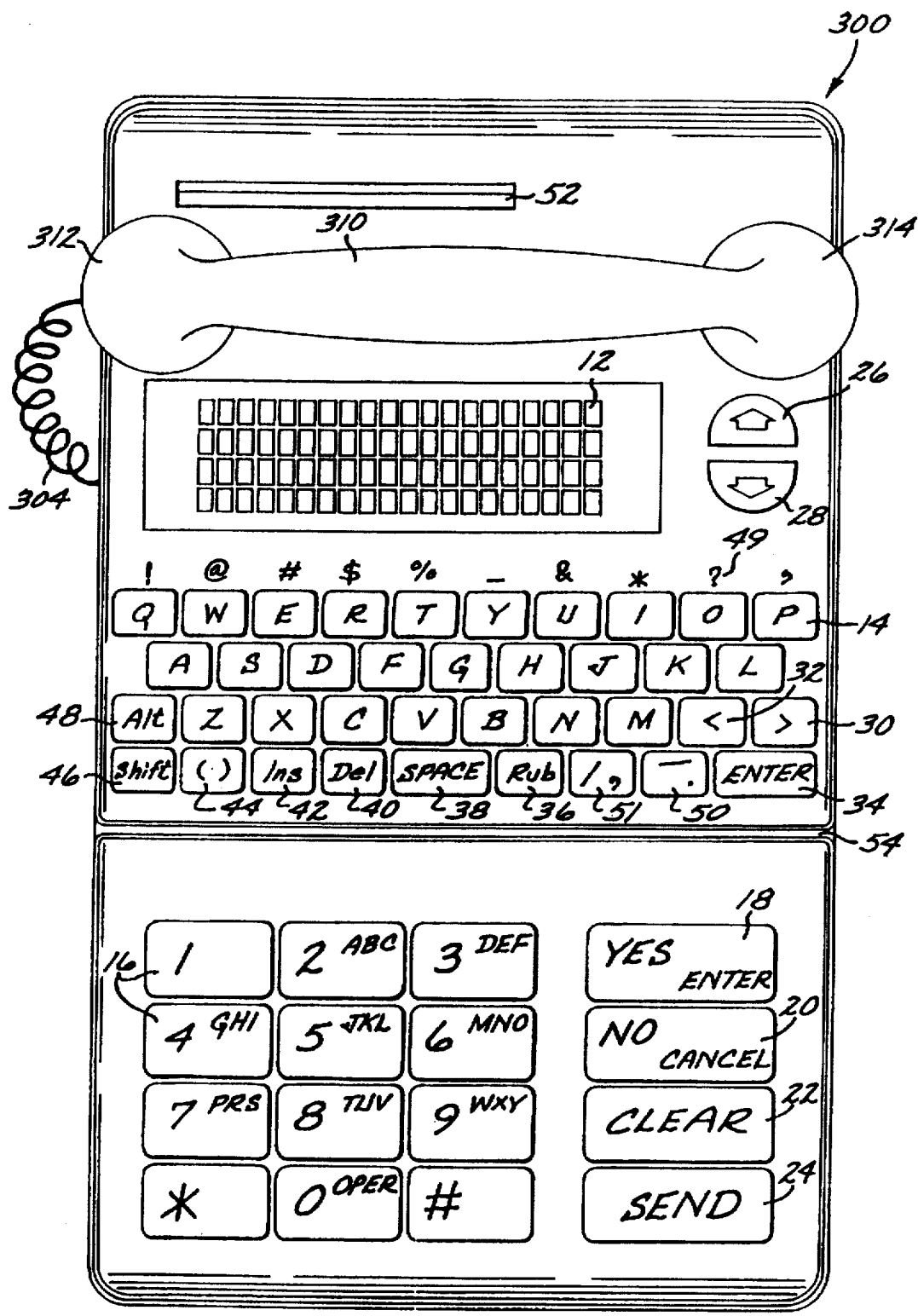
FIG. 11 is a top view of a terminal including a telephone in accordance with the present invention.

FIG. 11 is a top view of a terminal 300, which has a display 12, a QWERTY alphabetic keyboard 14, a numeric keypad 16 and a magnetic card reader slot 54. Miscellaneous keys are included on terminal 300 and are the same as shown in FIG. 1 for terminal 10. The terminal 300 also includes a printer which is internal to the terminal and printed paper is fed through paper slot 52. The terminal 300 operates in the same manner as the terminal shown in FIG. 1; however, the terminal 300 includes a telephone handset 310 which has an earphone 314 and a microphone 312. A coiled cord 304 attaches the telephone handset to the terminal.

By including a telephone function with the terminal 300, the overall utility of the terminal is increased. The terminal becomes a telephone with not only the normal capabilities of a telephone, including numerical keypad 16 which can also be used as a telephone dialing keypad, but also includes a QWERTY alphabetic keyboard and the other functions of the terminal. A user can use the telephone to contact a merchant to perform a purchase payment transaction, and then when the user and the merchant are ready, the terminal modem can be used to perform a purchase payment transaction as described above. The telephone is also useful for bill payment transactions.

Figure 12:
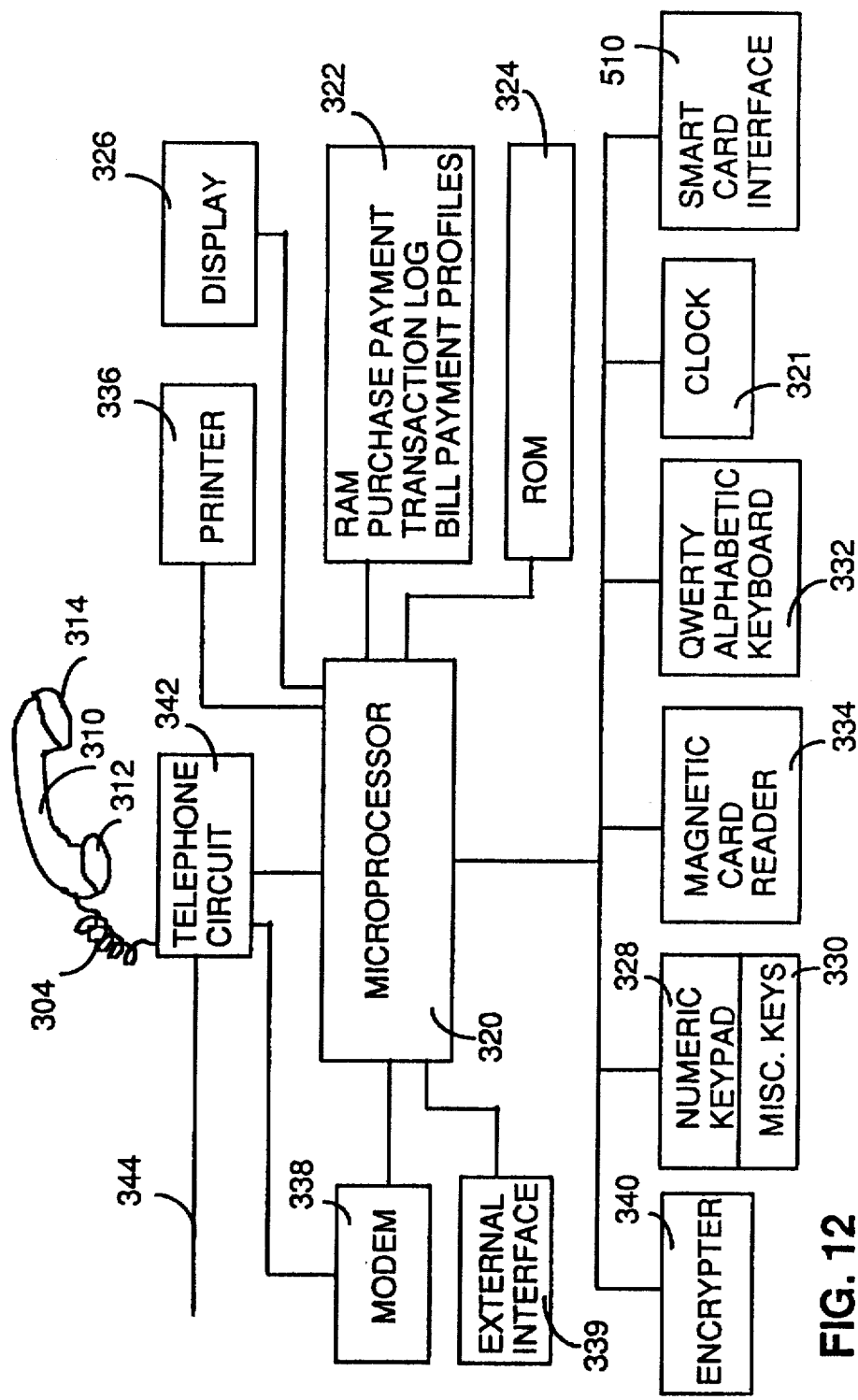
FIG. 12 is a functional block diagram of a terminal including a telephone in accordance with the present invention.

FIG. 12 is a block diagram of the terminal 300. A microprocessor unit 320 is coupled to RAM 322, ROM 324, display 326, numeric keypad 328, miscellaneous keys 330, alphabetic keyboard, which is a QWERTY keyboard 332, magnetic card reader 334, printer 336, encrypter 340, and modem 338. The microprocessor unit 320 also has an interface to clock 321 and to telephone circuit 342. The terminal 300 is connected to a telephone line 344 which connects to telephone circuit 342. The telephone circuit has an interface to modem 338. As shown, the telephone hand piece is connected to the telephone circuit 342.

The display block 326 in FIG. 12 corresponds to the liquid crystal display 12 shown in FIG. 11. Similarly, the alphabetic keyboard 332 shown in FIG. 12 corresponds to QWERTY alphabetic keyboard 14 shown in FIG. 11. The printer 336 and magnetic card reader are not visible in FIG. 11; however, the slot 54 is used to swipe a magnetically coded card and paper slot 52 is associated with the printer. Of course the numeric keypad 328 and the miscellaneous keys 330 of FIG. 12 correspond to the numeric pad 16 and the various miscellaneous keys shown in FIG. 11.

The telephone circuit essentially performs the function of converting voice and other audio into signals for transmission to a remote location. The telephone circuit 342 also receives signals from a remote location and converts the received signals into audio. This is the function of a telephone. The random access memory (RAM) 322 is used to store a purchase payment transaction log and bill payment profiles. Each purchase payment transaction in the transaction log includes a date and time of a purchase payment transaction, an amount of the purchase payment transaction, information identifying a merchant, information identifying an item or service that is purchased, and data for identifying the transaction. When the terminal is used for a purchase payment transaction, the user is prompted to swipe a credit or debit card through the magnetic card reader. If the user swipes a debit card, then the user is prompted to enter an account type such as savings or checking. The user is also prompted to enter a personal identification number which is then encrypted by encrypter 340. Alternately, the encryption could be done with firmware that is stored in ROM 324. Then the user is prompted to enter a dollar amount for the purchase and this dollar amount is validated to determine that it is within range limits set by an issuing authority for the debit card. Then the user enters information identifying the merchant that will sell the item or service and data identifying the item or service to be purchased. This information is then communicated to a remote host computer such as the remote host system 80 which includes computers and links to debit networks. If the user uses a credit card then the remote host computer debits a credit card account. If the user uses a debit card then the remote host computer transfers funds from the user's account to the merchant's account then the transaction log of purchase payment transactions stored in the terminal is updated with data for the purchase payment transaction, including a date and time of the purchase payment transaction, the amount of the purchase payment transaction, information identifying the merchant, information identifying the item or service purchased and data for identifying the transaction.

A bill payment transaction is initiated by either the terminal prompting the user to pay a bill for a certain profile, because the date read from clock 312 matches the next date to send payment for a profile, or the user can initiate a bill payment transaction. The profiles stored in RAM 322 can be displayed to the user and the user can select a profile for which a bill payment transaction will be performed. Then the terminal displays the amount of the last bill payment to the user. The user then can accept the amount of the last bill payment for the amount of the payment to be made or the user can enter an amount for the bill payment amount. The user is then prompted to swipe a credit or debit card through the magnetic card reader. If the user swipes a debit card then the user is prompted to enter an account type such as savings or checking. Then the user is prompted to enter a personal identification number, which is then encrypted by encrypter 340. Then the information is communicated to the remote host computer using modem 338. The remote host computer collects the payment by debiting a credit card account if the user uses a credit card or transferring funds from a debit card account, if the user uses a debit card. The selected profiles are then updated by updating the amount of the last bill payment to the bill payment amount that was just made, and updating the date on which the last bill payment was sent to the date of the bill payment transaction, which can be read from clock 321 or obtained from the remote host computer via telephone line 344 and modem 338. The next date to send a bill payment is also updated, this can also be performed by reading a date from clock 321 and setting the date for the next bill payment to be one month from the current date. Then the clock 321 is used by the microprocessor unit 320 to periodically compare a date read from clock 321 to the next date to send a bill payment for each profile stored in RAM 322. If one of the profiles has a next date to send a bill payment that matches the date on clock 321, then the user is prompted to make a bill payment transaction for that profile.

Figure 13:
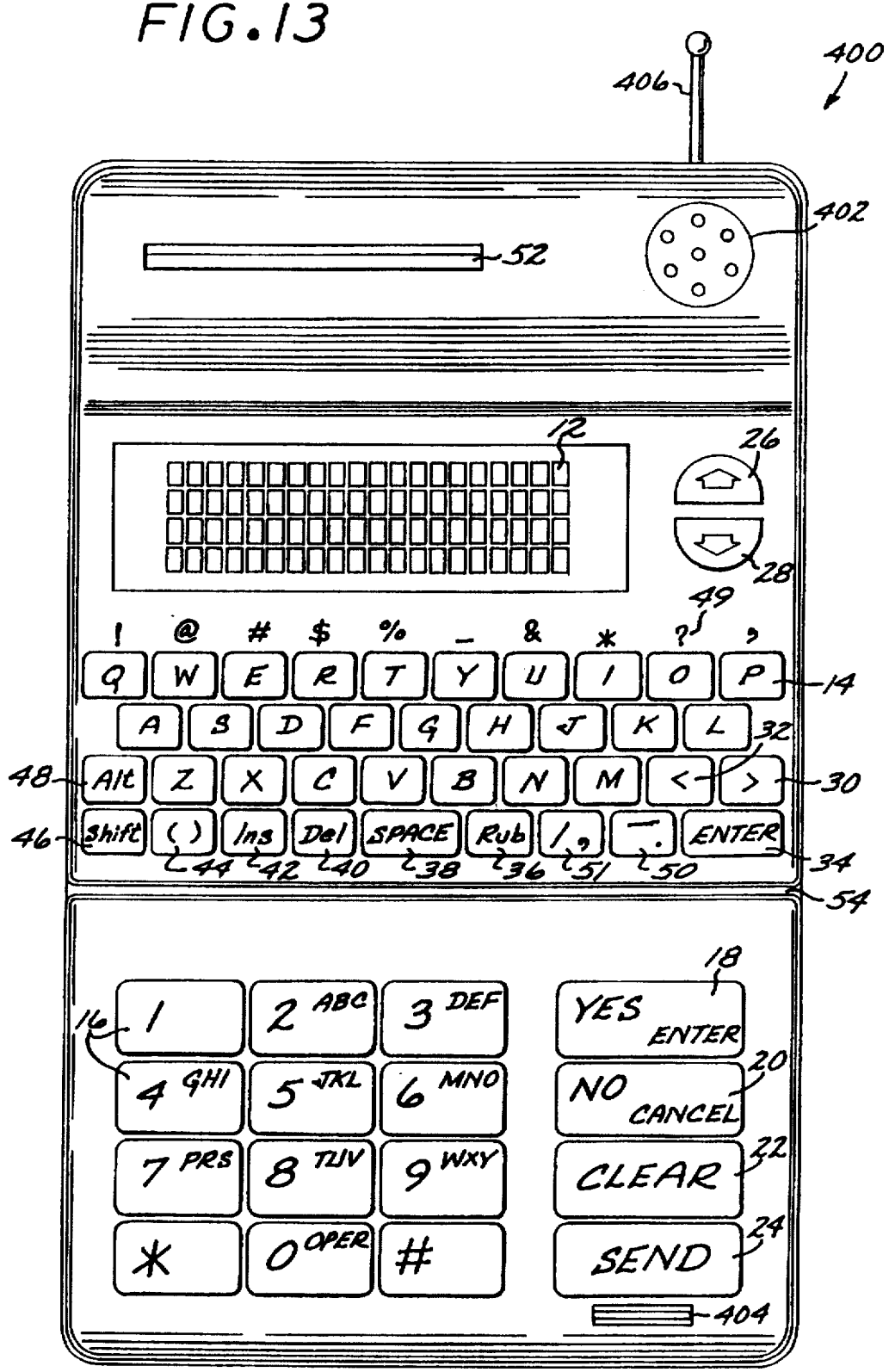
FIG. 13 is a top view of a terminal including a cellular telephone or wireless transmitter/receiver in accordance with the present invention.

A specific embodiment of a terminal for conducting purchase payment and bill payment transactions is shown in FIG. 13. The terminal 400 is similar to the terminal 10 of FIG. 1 and the terminal 300 of FIG. 11. The functions of the keys and the display are the same; however, the terminal 400 shown in FIG. 13 is designed to be more portable than the terminal of FIG. 11. The terminal of FIG. 11 is designed for desk top use and has a telephone handset 310. The terminal 400 of FIG. 13 has a cellular telephone or a wireless communication capability built into the terminal, which provides portability for the terminal. To provide for audio communications, the terminal 400 has an ear piece 402 and a microphone 404, which are used in the same way that an ear piece and a microphone on a telephone are used. The terminal 400 also includes an antenna 406 for wireless or cellular communications. A printer may or may not be included in the terminal 400. The paper slot 52 shown in FIG. 11 is not included in FIG. 13. For maximum portability it is desirable to not have a printer built into terminal 400. Instead an interface can be provided on terminal 400 which can be connected to a printer to print the purchase payment transaction log and the bill payment profiles whenever desired.

Figure 14:
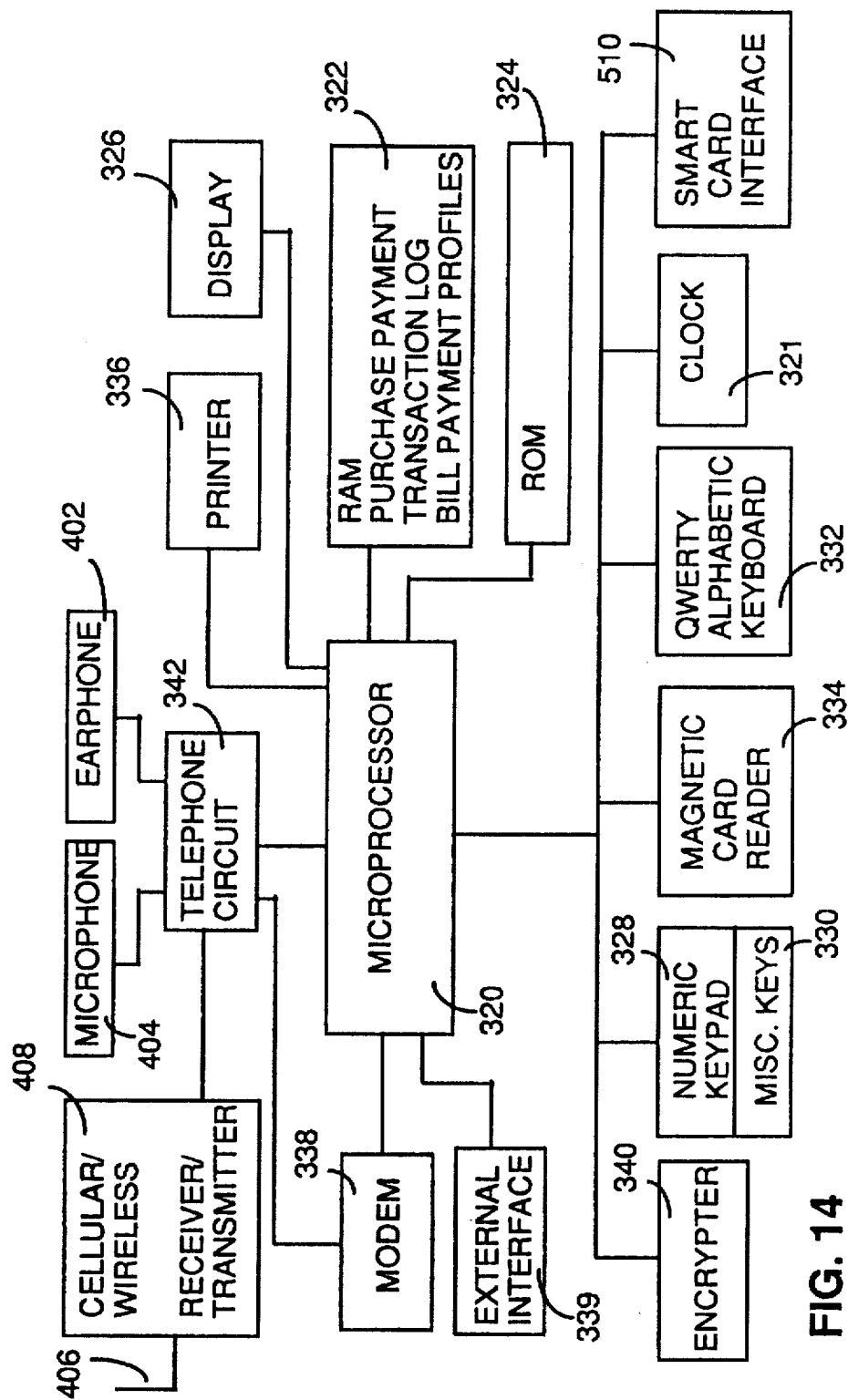
FIG. 14 is a functional block diagram of a terminal including a cellular telephone or wireless transmitter/receiver in accordance with the present invention.

FIG. 14 shows a block diagram of the terminal 400. The block diagram is very similar to the block diagram of FIG. 14; however, instead of having a connection to telephone line 344, the telephone circuit 342 connects to the cellular/wireless transmitter/receiver 408 which transmits and receives via antenna 406. Also, rather than have a telephone handset 310, the terminal 400 has a built in microphone 404 and an earphone 402.

Figure 15:
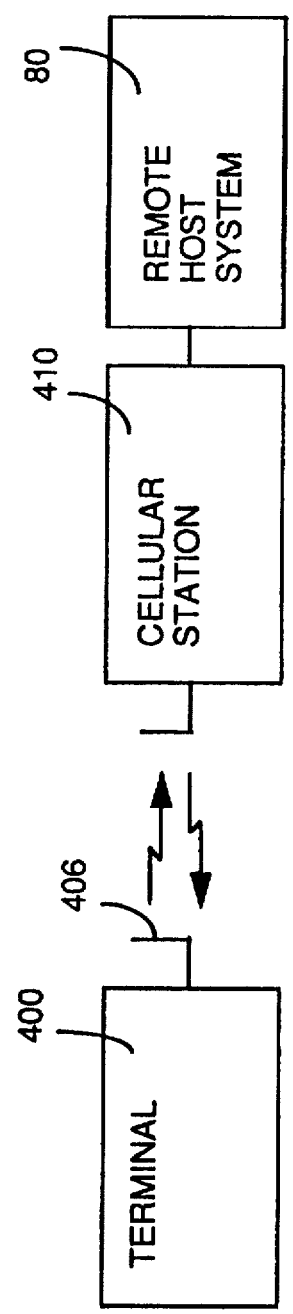
FIG. 15 is a functional block diagram of a system including a terminal with a cellular telephone or wireless transmitter and receiver in accordance with the present invention.

The operation of the terminal 400 is fundamentally the same as the terminal 300, except for the means of communication. The cellular/wireless transmitter/receiver 408 can operate either as a cellular telephone circuit for sending and receiving via a cellular telephone network or can be another form of wireless communication such as radio. FIG. 15 illustrates terminal 400 communicating via antenna 406 to cellular station 410. The cellular station could then connect to remote host 80 via a telephone line.

In FIG. 14 a printer 336 is shown connected to microprocessor unit 320. As described, the printer 336 can be built into the terminal 400 or printer 336 can be external to the terminal 400 and line 335 can be used to connect the terminal 400 to the printer 336.

Figure 16:
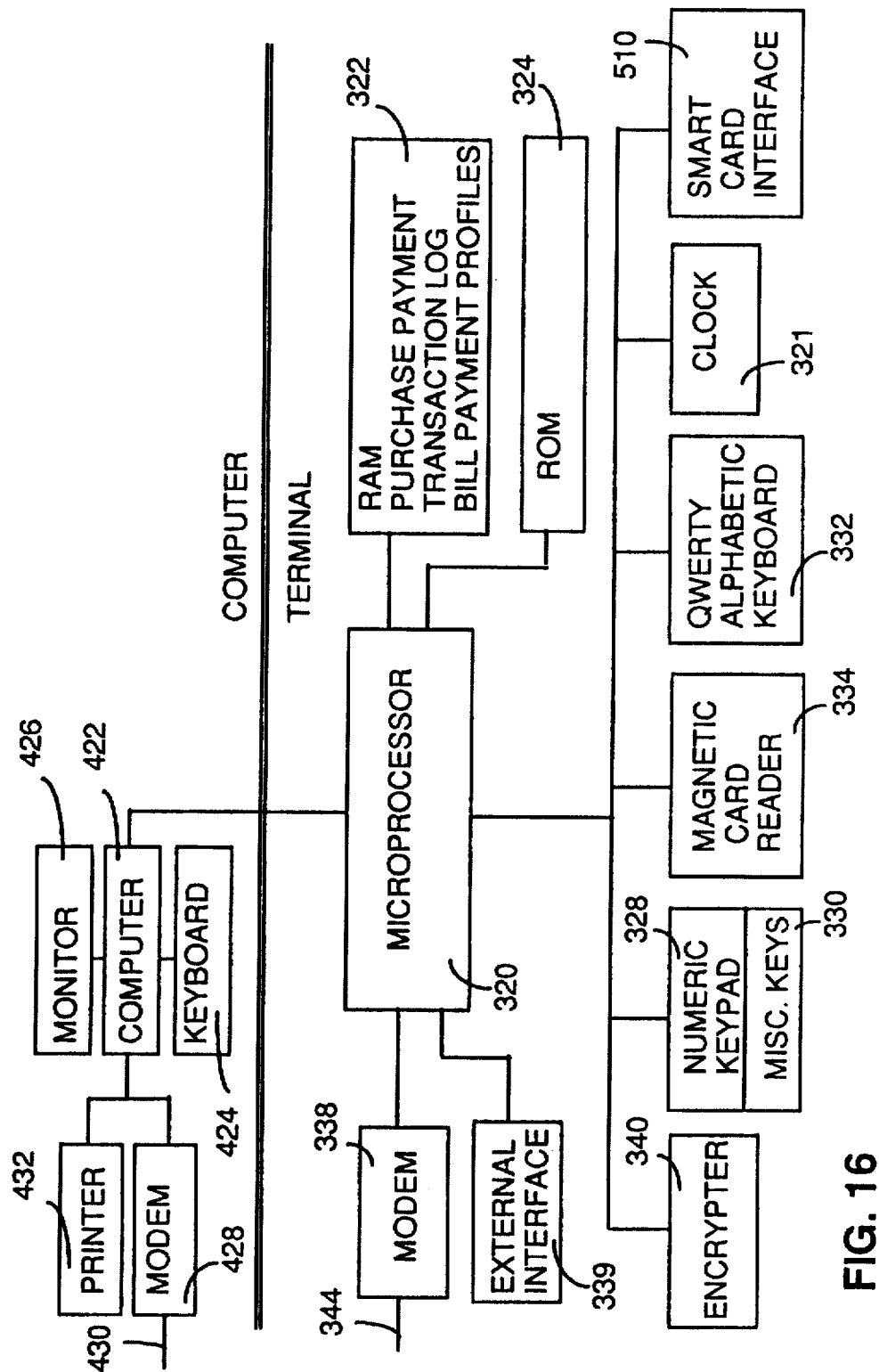
FIG. 16 is a functional block diagram of a system including a terminal for performing transactions using a computer in accordance with the present invention.

Another embodiment of a system for remote purchase payment and remote bill payment transactions is shown in FIG. 16. The system of FIG. 16 has a terminal 500 connected to a computer 422. The computer 422 has a computer monitor 426, a computer keyboard 424, a printer 432 and a modem 428 for communication via telephone line 430. The terminal 500 includes microprocessor 320, RAM 322, ROM 324, numeric keypad 328, miscellaneous keys 330, a QWERTY alphabetic keyboard 332, a clock 321 and a magnetic card reader 334. The terminal 500 also includes an encrypter, which is connected to the microprocessor 320. The terminal 500 does not need to have a display or a printer, because these are available in the computer system. For communication to the remote host computer either the modem 428 coupled to the computer 422 or the modem 338 in the terminal can be used.

A transaction log of purchase payment transactions can be stored in either the RAM 322 of the terminal 500 or in a memory contained within computer 422. As described before, a purchase payment transaction log consists of a date and time of a purchase payment transaction, an amount of the purchase payment transaction, information identifying the merchant, information identifying an item or service purchased and data for identifying the transaction. To perform a purchase payment transaction, the user is prompted via the computer monitor 420, which is a display, to swipe a credit or debit card through the magnetic card reader on the terminal. If the user swipes a debit card then the user is prompted to enter an account type such as savings or checking. Then the user is prompted to enter a personal identification number via the computer monitor. Then the encrypter 340 shown in FIG. 16 or firmware in ROM 324 are used to encrypt the entered personal identification number. Then the user is prompted via the computer monitor 426 to enter a dollar amount for the purchase and the dollar amounts are validated by an issuing authority to determine whether they are within range for the debit or credit card. Then the user is prompted via the computer monitor to enter at least a portion of the information identifying the merchant and to enter data identifying an item or service to be purchased. Then the modem 428 attached to computer 422 is used to send the information to the remote host computer which then debits the credit card or transfers funds from the debit card account. Then the transaction log of purchase payment transactions stored in either RAM 322 or in a memory in computer 422 is updated with information including the date and time of the purchase payment transaction, an amount of the purchase payment transaction, information identifying the merchant, information identifying the item or service purchased, and data for identifying the transaction.

The system in FIG. 16 can also be used for bill payment transactions. A bill payment transaction is initiated either by the user or by the terminal prompting the user via messages on computer monitor 426 that the current date is the same as the next date for a bill payment to be sent for a particular profile.

Once the user has selected a profile for a bill payment transaction, then the amount of the last bill payment is displayed on the computer monitor. The user can accept this amount for the current bill payment or enter a new amount for the bill payment. Then the user is prompted via the computer monitor to swipe a credit or debit card through the magnetic card reader. If the user swipes a debit card then the user is prompted via the computer monitor to enter an account type such as savings or checking and to enter a personal identification number. The personal identification number is encrypted using the encrypter 340 or using firmware stored in ROM 324 and performing the encryption in microprocessor 320. Then the computer 422 communicates the information to a remote host computer via modem 428 and the remote host computer either debits a credit card or transfers funds from a debit card account to the merchant whose bill is to be paid. Then the profile is updated. The amount of the last bill payment is updated to the current bill payment amount, the date on which the last bill payment was sent is updated to the current date, and the next date to send a bill payment can be updated. A clock 321 can be included in terminal 500 or a clock which is normally a part of a computer 422 can be used to determine the current date and also to add whatever time is deemed appropriate (e.g. one month) to the current date in order to derive a next date to send a bill payment. This same clock can be used for prompting the user to perform a bill payment transaction for a profile if a date read from the clock matches a next date to send a bill payment for the stored profile.

In another embodiment of the invention, in addition to the magnetic card reader 132 shown in FIG. 4, and the magnetic card reader 334 shown in FIGS. 12, 14, and 16, a smart card reader 510, as shown in FIGS. 4, 12, 14, and 16 is added. The single slot 54 shown in FIGS. 11 and 13 can be used to read credit and debit cards and also to read and write smart cards. Credit cards and debit cards can be swiped through the single slot 54 and smart cards can also be swiped or just placed into the slot for reading and writing operations. A card inserted into slot 54 is adjacent to a credit/debit/smart card reader, which can read credit, debit, and smart card, as well as, write a smart card. The credit/debit/smart card reader combines the magnetic card reader 334 and the smart card interface 510 into one reader capable of reading all types of cards.

A smart card is a card that is similar to a debit card, except that instead of having a magnetic strip on the back of the card, the smart card has an integrated circuit built into the card which has a processor and a memory. The memory is used to store data including the money balance in an account of the user. The smart card interface 510 can write information to the smart card and also read information from the smart card. The smart card interface 510 is positioned so that a smart card inserted in slot 54 can communicate with the smart card interface 510.

The operation of a smart card with a terminal of this invention is similar to operation with a debit card, except that when a smart card is used the user must enter a personal identification number (PIN) to use the smart card; however, because the smart card has a processor, the smart card can verify that the entered PIN is correct. Thus, it is not necessary to encrypt the PIN and send it over a telephone network to a remote host computer to conduct the transaction, as in the previously described embodiment using a debit card.

To use the smart card the user couples the smart card with the smart card interface 510 by inserting the smart card into the slot 54. Then the terminal prompts the user to enter a PIN, which is used to verify that the user owns the smart card. Then for a purchase payment transaction, the user is prompted to enter a dollar amount and also to identify a merchant and the item or service to be purchased. Then the smart card interface is used to communicate to the smart card and the smart card verifies that the account has a balance that is greater than the purchase dollar amount and that the entered PIN is correct. Then the processor debits an account tracked by the smart card by the entered dollar amount. Then the terminal commmunicates via the modem to the remote host computer to credit the merchant by the dollar amount and to order the purchased item or service. Then a transaction log of the purchase payment transaction is updated including the date and time, the dollar amount, information identifying the merchant, information identifying the item or service purchased, and data for identifying the transaction.

A bill payment transaction is similar to the bill payment transactions described above; however, again the use of the smart card is different than the use of the smart card. Profiles are displayed to the user and the user selects a profile for a bill payment transaction. The last bill payment is shown on the display and the user can either accept the amount of the last bill payment or enter an amount to be paid for the bill payment profile. Then the user couples the smart card with the smart card interface 510 by inserting the smart card into the slot 54. Then the terminal prompts the user to enter a PIN, which is used to verify that the user owns the smart card. Then the smart card interface is used to communicate to the smart card and the smart card verifies that the account has a balance that is greater than the amount to be paid and that the entered PIN is correct. Then the processor debits an account tracked by the smart card by the amount to be paid for the bill payment. Then the terminal commmunicates via the modem to the remote host computer to credit the merchant by the amount to be paid. Then the bill payment profile is updated by updating the amount of the last bill payment to the bill payment amount, the date on which the last bill payment was sent to the date of the bill payment transaction and by updating a next date to sent a bill payment.

Other than the difference of having a smart card interface and no magnetic card reader and the difference of using a smart card versus a debit card as described above, the terminals shown in FIGS. 1 and 4, 11 and 12, 13 and 14, and 16 operate identical to the description above for the terminals that use a magnetic card reader. For example, the clock 321 shown in FIG. 12, can be used as before to prompt a user to make a bill payment when the date on the clockdate on the clock matches the date of the next bill payment for a bill payment profile.

The terminals shown in FIGS. 1 and 4, 11 and 12, 13 and 14, and 16 can have various external interfaces, as indicated by serial/external interface 130 in FIG. 4 and external interface 339 shown in FIGS. 12, 14 and 16. The external interfaces can include a PCMIA card interface and a serial interface. The PCMIA card interface can be used to add functionality to the terminal, such as more memory. The PCMIA card interface can also be used to provide a modem built onto a PCMIA card. This allows the terminal to be easily upgraded as technology advances.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A portable terminal for allowing a user to conduct purchase and bill payment transactions with a remote host computer, the terminal comprising:

a QWERTY alphabetic keyboard for entering alphabetic information integral to the terminal;

a numeric keypad for entering numeric information integral to the terminal;

a display integral to the terminal;

a cellular phone integral to the terminal for communication with the remote host;

an earphone for receiving voice integral to the terminal and coupled to the cellular phone;

a microphone for transmitting voice integral to the terminal and coupled to the cellular phone;

a modem integral to the terminal coupled to the cellular phone for providing for data communication to the remote host computer via the cellular phone;

a slot for inserting cards integral to the terminal;

a credit/debit/smart card reader integral to the terminal and adjacent to the slot for reading information from credit, debit and smart cards inserted in the slot and for writing a new balance to a smart card inserted in the slot, wherein the information includes a user identifier and an issuer identifier for credit, debit and smart cards and in addition includes a balance for a smart card;

means for encrypting; and control means integral to the terminal for operating the terminal, the control means coupled to the QWERTY alphabetic keyboard, the numeric keyboard, the display, the modem, the credit/debit/smart card reader, and the means for encrypting;

wherein the modem and the cellular phone communicate with the remote host computer to transfer the information and an entered encrypted personal identification number (PIN) to the remote host computer and also transfers data for a transaction, including a payee identifier, an amount of payment, and if the transaction is a purchase transaction, an item identifier, and if the transaction is a bill payment transaction, a bill identifier, and the remote host computer causes a debit to a credit card account, if the user uses a credit card account, a fund transfer from a debit card account, if the user uses a debit card account, and a new balance to be written on a smart card, if the user uses a smart card.

2. The terminal of claim 1 further comprising means integral to the terminal and coupled to the control means for storing one or more profiles of bill payment transactions, each profile comprising information identifying the payee, an amount of the last bill payment paid to the payee, a date on which last bill payment was sent, and a next date to send bill payment.

3. The terminal of claim 2 further comprising:

means for controlling the display to display the profiles to the user;

means for the user to select a profile for a bill payment transaction;

means for controlling the display to display the amount of the last bill payment;

means for accepting the amount of the last bill payment for the selected profile or accepting an entered amount for the bill payment amount; and means for updating data in the selected profile including the amount of the last bill payment to the bill payment amount, the date on which last bill payment was sent to the date of the bill payment transaction, and the next date to send a bill payment.

4. The terminal of claim 3 further comprising means for prompting the user to perform a bill payment transaction for a profile, if a date matches a next date to send bill payment for the profile.

5. The terminal of claim 4 wherein the means for prompting the user to perform a bill payment transaction for a profile comprises:

a clock; and a comparator coupled to the clock for comparing the clock to a next date to send bill payment for the profile.

6. A method for allowing a user to conduct remote purchase and bill payment transactions with a remote host computer using a portable terminal including a QWERTY alphabetic keyboard for entering alphabetic information integral to the terminal, a numeric keypad for entering numeric information integral to the terminal, a display integral to the terminal, a cellular phone integral to the terminal for communication with the remote host, an earphone for receiving voice integral to the terminal and coupled to the cellular phone, a microphone for transmitting voice integral to the terminal and coupled to the cellular phone, a modem integral to the terminal coupled to the cellular phone for providing for data communication to the remote host computer via the cellular phone, a slot integral to the terminal, a credit/debit/smart card reader integral to the terminal and adjacent to the slot for reading information from credit, debit and smart cards inserted in the slot and for writing a new balance to a smart card inserted in the slot, means for encrypting, and control means integral to the terminal for operating the terminal, the control means coupled to the QWERTY alphabetic keyboard, the numeric keyboard, the display, the modem, the credit/debit/smart card reader, and the means for encrypting, the method comprising the steps of:

the user inserting into the slot a credit card, debit card, or smart card;

reading information from the inserted credit card, debit card or smart card using the credit/debit/smart card reader adjacent to the slot, the information including a user identifier and a issuer identifer and if a smart card is inserted, a balance;

the user entering a personal identification number (PIN), if the user inserts a debit card or smart card;

encrypting the entered personal identification number;

communicating with the remote host computer using the modem and sending to the remote host computer the read information, the encrypted PIN, and data for a transaction, including a payee identifier, an amount of payment, and if the transaction is a purchase transaction, an item identifier, and if the transaction is a bill payment transaction, a bill identifier; and the remote host computer causing a debit to a credit card account, if the user uses a credit card account, a fund transfer from a debit card account, if the user uses a debit card account, and a new balance to be written on a smart card, if the user uses a smart card.

7. The method of claim 6 further comprising the step of storing one or more profiles of bill payment transactions, each profile comprising information identifying the merchant, an amount of a last bill payment, a date on which last bill payment was sent, and a next date to send bill payment.

8. The method of claim 7 further comprising the steps of:

controlling the display to display the profiles to the user;

the user to selecting a profile for a bill payment transaction;

controlling the display to display the amount of the last bill payment;

the user accepting the amount of the last bill payment for the selected profile or accepting an entered amount for the bill payment amount; and updating data in the selected profile including the amount of the last bill payment to the bill payment amount, the date on which last bill payment was sent to the date of the bill payment transaction, and the next date to send a bill payment.

9. The method of claim 8 further comprising the step of prompting the user to perform a bill payment transaction for a profile, if a date matches a next date to send bill payment for the profile.

10. The method of claim 6 further comprising the step of the user communicating by voice to the payee via the cellular phone, if the transaction is a purchase transaction.

* * * * *